W. CHURCH.
DEVICE FOR MEASURING FEET, LASTS, AND THE LIKE.
APPLICATION FILED JUNE 3, 1908.
973,475.
Patented Oct. 25, 1910.
5 SHEETS—SHEET 1.
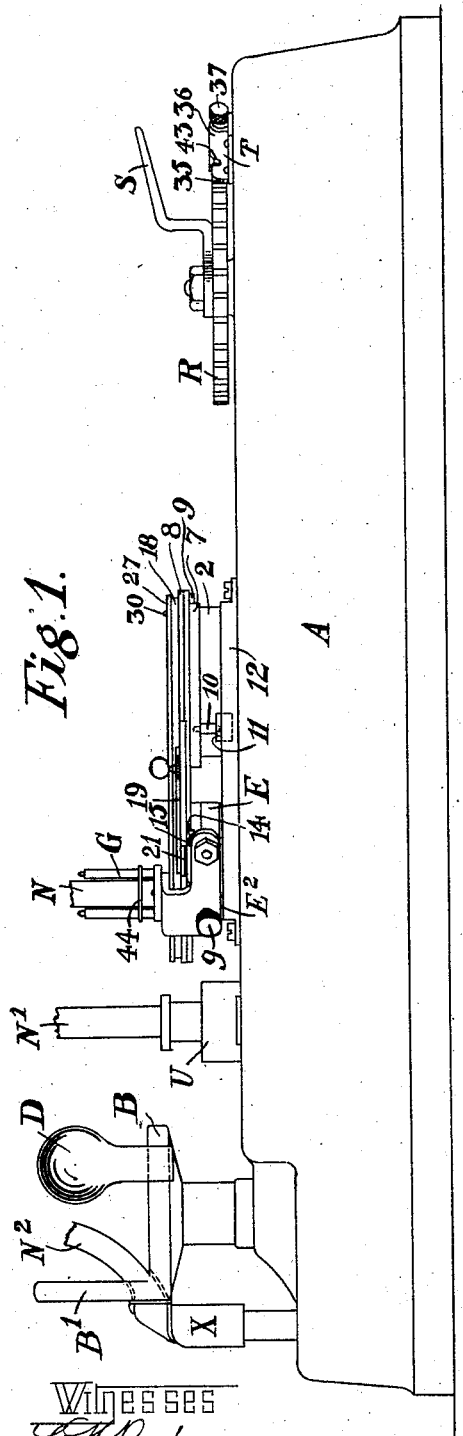
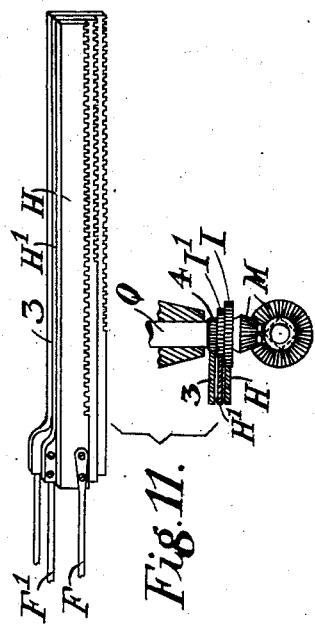
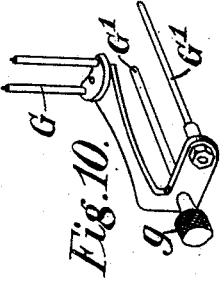
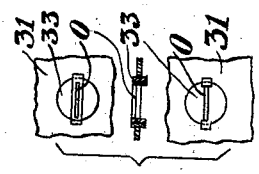
Witnesses
Inventor:
William Church,
By Dodge and Sons,
Attorneys.

W. CHURCH.
DEVICE FOR MEASURING FEET, LASTS, AND THE LIKE.
APPLICATION FILED JUNE 3, 1908.
973,475.
Patented Oct. 25, 1910.
5 SHEETS—SHEET 2.
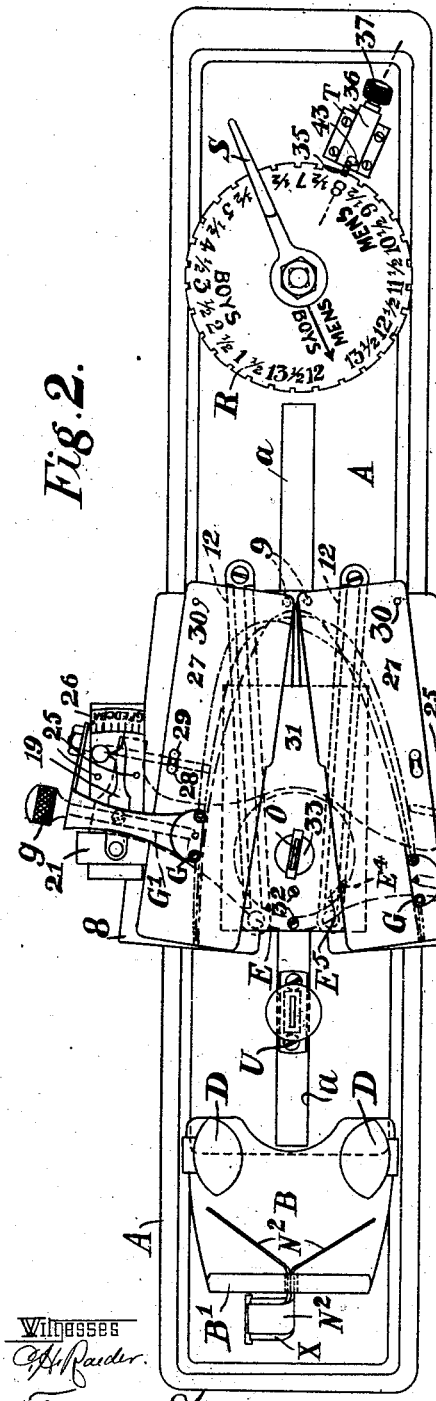
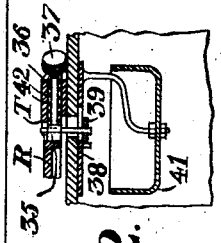
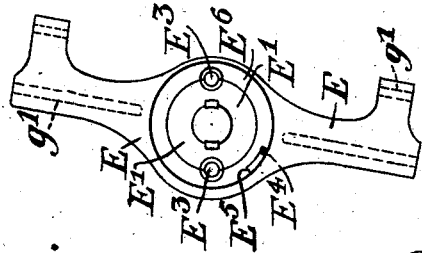
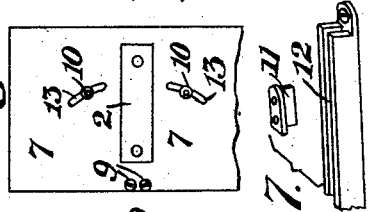
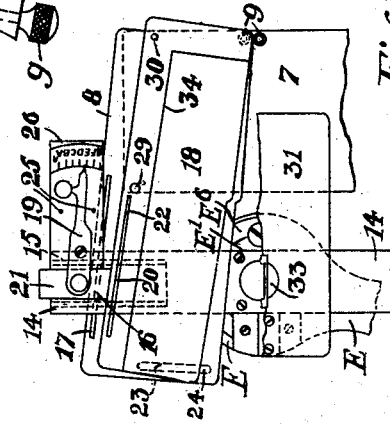
Witnesses
Inventor:
William Church,
By Dodge and Sons,
Attorneys W. CHURCH.
DEVICE FOR MEASURING FEET, LASTS, AND THE LIKE.
APPLICATION FILED JUNE 3, 1908.
973,475.
Patented Oct. 25, 1910.
5 SHEETS—SHEET 3.
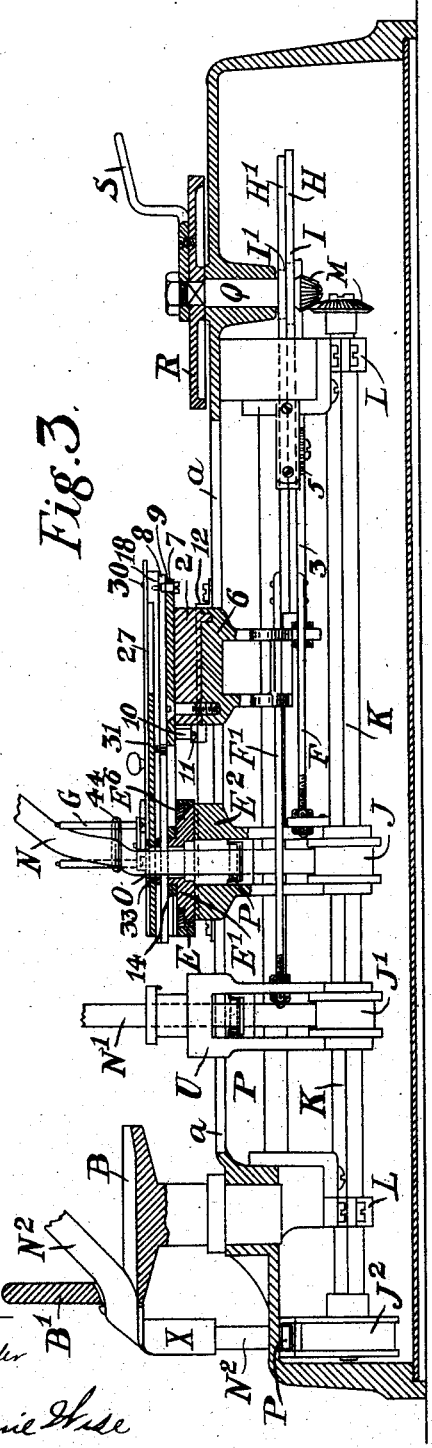
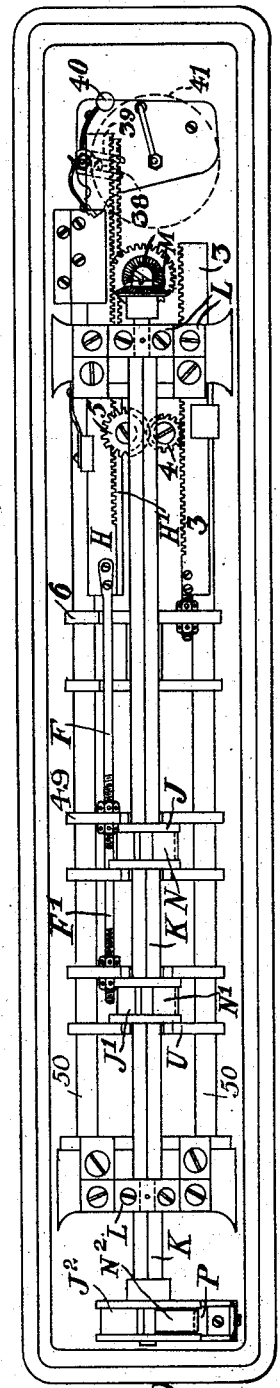

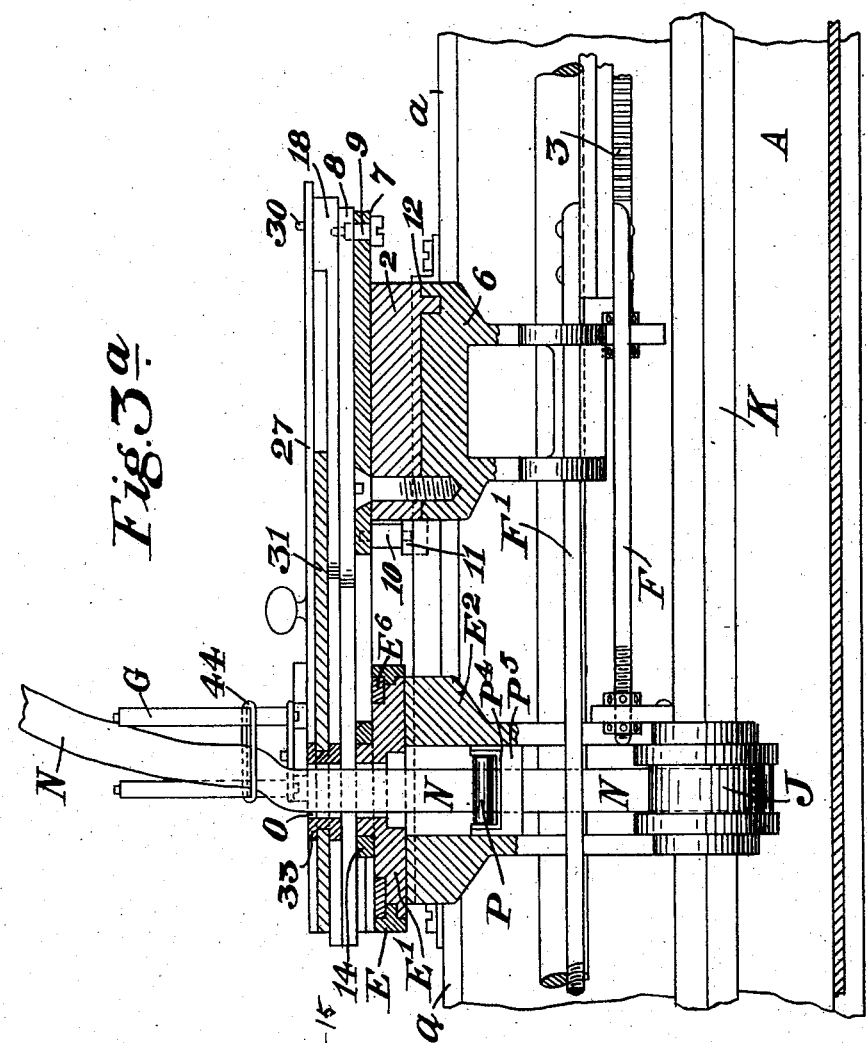

W. CHURCH.
DEVICE FOR MEASURING FEET, LASTS, AND THE LIKE.
APPLICATION FILED JUNE 3, 1908.
973,475.
Patented Oct. 25, 1910.
5 SHEETS—SHEET 5.
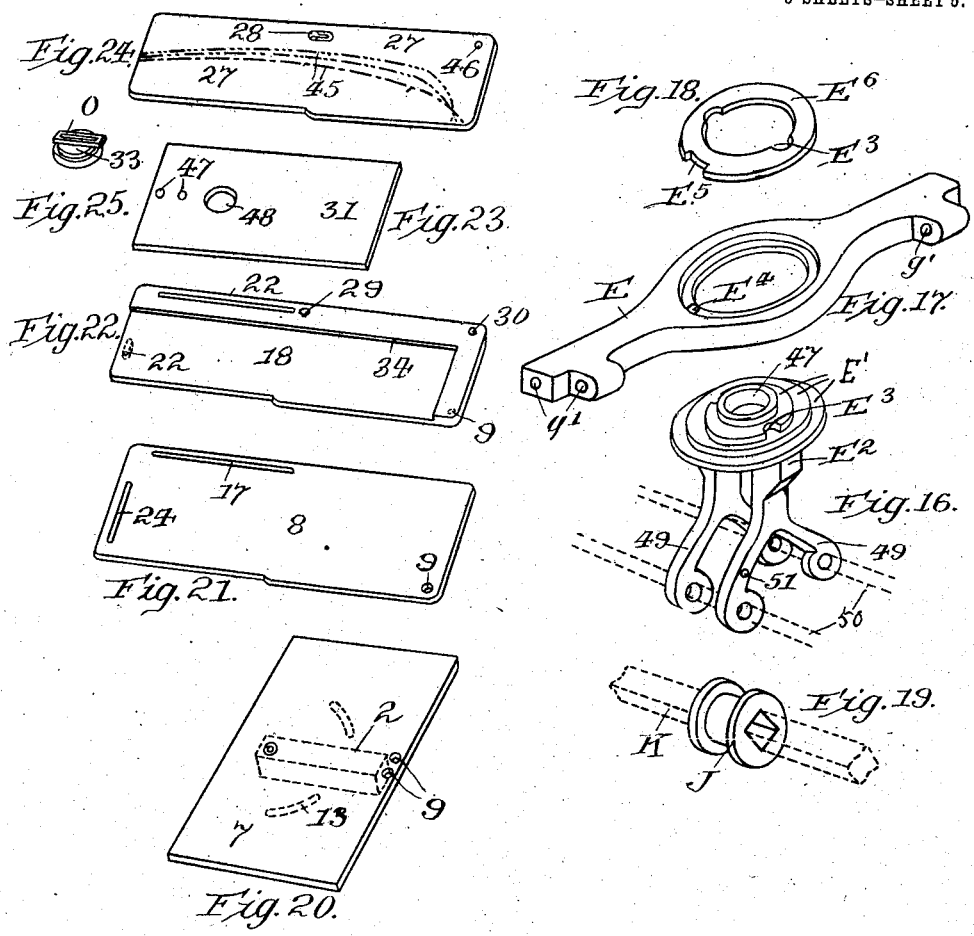
Witnesses
Inventor:
William Church,
By Dodge and Sons,
Associate Attys.
THE NORRIS PETERS CO., WASHINGTON, D. C.

UNITED STATES PATENT OFFICE.

WILLIAM CHURCH, OF NORTHAMPTON, ENGLAND.

DEVICE FOR MEASURING FEET, LASTS, AND THE LIKE.

973,475.   Specification of Letters Patent.   Patented Oct. 25, 1910.

Application filed June 3, 1908. Serial No. 436,522.

*To all whom it may concern:*

Be it known that I, WILLIAM CHURCH, a subject of the King of Great Britain, residing at Northampton, in the county of Northampton, in the Kingdom of England, boot manufacturer, have invented certain new and useful Improvements in Devices for Measuring Feet, Lasts, and the Like, for which application has been made in Great Britain, No. 14,282, dated June 20, 1907.

This invention is designed to enable a boot retailer to fit customers' feet with boots and shoes from stock far more accurately than hitherto, and to produce as good or better a fit than if the boots were made to measure.

In the accompanying drawings, Figure 1 is a side elevation of the machine; Fig. 2, a top plan view thereof with the ball joint carriage and the fore part gage set for a right hand boot; Fig. 3, a longitudinal section of the machine; Fig. 3$^a$, an enlarged view of a portion of Fig. 3, partly in section, the plane of section being upon the longitudinal center line of the apparatus; Fig. 4, a bottom plan view thereof; Fig. 5, a fragmentary plan view of the fore part gage with certain parts removed; Fig. 6, an inverted plan view of the bottom table of the fore part gage; Fig. 7, a detail view of the slotted guide and foot piece for causing the fore part gage to expand or contract as it moves longitudinally; Fig. 8, a plan view of the ball joint carriage; Fig. 9, a plan, section and underneath plan respectively of the loose center piece with tape orifice; Fig. 10, a detail view of the ball joint guard; Fig. 11, a perspective view and sectional elevation of a slightly modified form of gear for working the ball joint and instep carriages and the fore-part gage; Fig. 12, a detail view of the locking finger and bell mechanism; Fig. 13, a plan view of the rollers P and P$^1$ and their guiding mechanism; Fig. 14, an elevation of the same; Fig. 15, a sectional elevation of the same taken on the line 15—15, Fig. 13; Fig. 16, is a perspective view of the block E$^1$ with its depending supporting legs forming a part of the ball joint carriage; Fig. 17 is a perspective view of the member E also forming a part of the ball joint carriage; Fig. 18 is a perspective view of the ring E$^6$ which is mounted as will be later described; Fig. 19 is a detail view of the sleeve J; Fig. 20 is a perspective view of the table 7; Fig. 21 is a perspective view of the table 8, forming a part of the fore part gage; Fig. 22 is a perspective view of one of the tables 18; Fig. 23 is a perspective view of the cover plate 31; Fig. 24 is a perspective view of one of the plates 27 upon which the contour of shoes may be engraved; and Fig. 25 is a perspective view of the center piece 33. The various views, 16 to 25 inclusive, are details of component parts of the carriage of the machine.

Referring first to Figs. 1, 2, 3, 3$^a$, 9 and 10, A is the casing or base of the apparatus, B a raised platform for the heel so that the latter is somewhat raised when the foot is measured, and this platform B corresponds approximately to the height of the heel in the pair of boots or shoes worn by the person being measured.

B$^1$ is an upright fixed at the rear of the platform B forming an abutment for the rear part of the heel.

D are wings made of springy material which are fastened to the platform B, and serve to steady the heel and keep it central. On the casing A there is mounted a sliding carriage E, Figs. 2 and 8, which is mounted or guided on the circular block E$^1$ (see also Figs. 14 and 15) fastened by screws through the holes E$^3$ to a depending bracket E$^2$ which has legs 49 mounted upon the longitudinally fixed rods 50 and provided with laterally adjustable guards G Figs. 3 and 10 which act as locators for the ball joint. The depending bracket E$^2$ projects through a slot $a$ in the base A, the said slot running nearly the length of the base. The guards G have rods G$^1$ Figs. 2 and 10 sliding in holes or sockets $g^1$ Fig. 8 in the carriage E, and they are adjusted from both sides of the machine, either by pushing or pulling the knobs $g$. This carriage E with its block E$^1$, and its depending bracket E$^2$ is hereinafter referred to, as the ball joint carriage. It is capable of being adjusted longitudinally of the device by suitable means, such as a rack H and pinion I. The ball joint carriage is carried by its depending bracket E$^2$, and to this bracket by means of a hole 51 is attached one end of a rod F Figs. 3 and 11 attached to the rack H. The bracket E$^2$ embraces a rotatable sleeve J, having a square hole through it. Through this square hole, a shaft K of square section passes, (see Fig. 19) journaled suitably at both ends of the casing at L, so as to be capable of being rotated by bevel gearing M, actuated from the same shaft Q as the rack H and pinion I above referred to. To the rotating sleeve J, a tape measure N is secured at approximately its middle. This tape or measure N doubled is wound around the sleeve, and its ends are brought through a suitable orifice O above the depending bracket E² and through block E¹ secured to the bracket. Upon this block E¹ the carriage E is capable of being turned through a considerable angle say approximately 30° for right and left feet, the turning being limited by a stop E⁴ Fig. 8 on the carriage E, moving in the slot E⁵ against the ends of which the stop abuts, the slot being formed in a ring E⁶ (see Figs. 16 and 17) fixed immovable to the bracket E² by screws passed through the holes E³.

The effect of the foregoing arrangement is that when the ball joint carriage E is moved backward and forward by the rack and pinion device H and I, the shaft K carrying the sleeve J is rotated, and therefore the sleeve J to which the measure is secured, caused to wind up or unwind the two lengths of the measuring tape N, according as the ball joint carriage E is brought to, or retracted from, the heel support B. The means for rotating the pinion I and the bevel gearing M, preferably consist of an upright shaft Q carrying a rotating disk R and a handle S, the disk being marked with sizes and half sizes. The rotating disk can be arranged so as to rotate under the main cover of the device, so that the numbers marked thereon will be caused to come underneath a small orifice in the cover or opposite a locking device or pointer and so indicate the distance between the ball joint carriage and the heel, that it will indicate the size of boot or shoe required. A suitable locking device T hereinafter described is provided for locking the disk R in its adjusted position. The indication through the orifice, or a particular numeral coming opposite the locking device, will give the size of boot required, while the measurement on the tape will give the actual fit required whether arranged in a scale A, B, C, D, etcetera, or 1, 2, 3, 4, etcetera.

It will be obvious that the automatic adjustment of the tape N as the ball joint carriage E is moved backward and forward is necessary, as the measurement around the ball joint for a given fitting will vary according to the size of boot required, that is to say according to the length of the foot.

The instep carriage U also mounted by depending legs on the rods 50 is arranged on a similar plan to the ball joint carriage E except that the adjustable guard is not required, and it is connected by a different rack and pinion gear through the rod F¹, with the disk R and handle S, namely a rack H¹ and a pinion I¹ Figs. 3 and 11 of smaller diameter than the pinion I, so that its motion will be somewhat slower than that of the ball joint carriage E. As there is in all normal feet practically a fixed relation from the distance of the heel to the ball joint and from the heel to the instep, the relative travels of the ball joint carriage E and the instep carriage U can be easily fixed. The devices for measuring the circumferences of the heel, and the instep have an arrangement for shortening or lengthening the tapes, similar to that for adjusting the tapes of the ball joint carriage, that is to say, J¹ is a sleeve, and J² Fig. 3 a pulley on the square shaft K, and N¹ and N² tapes, secured approximately at their middle thereto.

X is a guide for the tape N² adapted to change the direction of travel of the tape from a vertical travel into a diagonal one.

P are spring rollers to keep the tapes taut on the sleeve J J¹ and pulley J². Referring to Figs. 13, 14 and 15, it will be seen that these consist of the roller P journaled in fixed bearings, and a second roller P¹ journaled in slots P⁶ formed in the sides of the supporting bracket P⁴. The roller P¹ is pressed against the roller P through the agency of a spring P² acting on a sliding member P⁷ bearing against the journals on the ends of the roller P¹, and the other end of the spring bearing against an abutment carried on the bracket P⁴. The bracket P⁴ is fixed upon a cross piece P⁵ in the cavity of the bracket E². The function of the rollers is to apply a grip or pressure to the tapes to keep them taut.

2 is a third sliding piece or carriage mounted upon and secured to a bracket 6 which has legs carried by the longitudinally fixed rods 50 so as to slide thereon (Figs. 1, 2, 3, 4, 5 and 6) and I provide mechanism for sliding the carriage relatively to, and at a greater speed than the other two carriages E and U so that when the ball joint carriage E comes under the ball joint of the foot, the instep carriage U comes under the instep, and this third movable slide 2 comes under the fore part of the foot. This movement is provided for by providing an extra rack 3 and a train of toothed wheels 4 and 5 Fig. 4 and a third one (see Fig. 11) gearing in the rack H. The rack 3 is bolted to the bracket 6 of the carriage 2, and the pinion 4 derives its motion from rack H by means of the intermediate pinions, the pinions being of such a size as to produce the required speed relatively to the other two carriages. Mounted on the movable slide or carriage 2 is a table 7, (see Figs. 1, 3, 3ª, 5, 6 and 20) and on this table is pivoted a fore part gage. This fore part gage comprises a pair of flat tables 8 (see Figs. 1, 3, 3ª, 5 and 21) which overlap the ball joint carriage E. The tables 8 are pivoted to the table 7 on separate pivots 9, there being a space between the tables for the orifice O. Each table 8 has a stud 10 (Fig. 6) on its under side, having a piece 11 at its end, which enters a slotted guide 12 (Fig. 7) fixed to the base A. These slotted guides 12 are shown in Fig. 2 set at an angle, the angle being such as to cause the tables 8 to expand, as the table 7 moves toward the disk R, and contract as they move toward the heel. Slots 13 are provided in the table 7 to enable the pins 10 to pass through, and allow for the pins to approach or recede from each other. By engraving shapes or designs on these tables 8 of the various bottom shapes of the fore part of boots supplied, the shape of boots at the fore part most suitable for the comfort of the foot being measured, can be ascertained. But with this degree of simplicity, the apparatus operates very imperfectly, because the width of feet do not bear a fixed proportion to their length, and consequently some additional means is required to adjust the width of the tables of the forepart gage, to suit the width of individual feet being measured. In order to effect this, there is employed according to this invention on the top of the two tables 8, another pair of tables 18. These tables 18 (see Figs. 1, 3, 3ª, 5 and 22) are pivoted to the lower tables at 9. They move with the lower tables 8, but are adjustable to any width required by the movement of pivoted handles 19 coupled to the respective tables 18 by a stud 20 on the coupling rods 21, engaging a slot 22 in the tables 18. The movement of the tables 18 is restricted, by means of a pin 23 on each table 18 entering a slot 24 in the lower table 8, or by the stops 25.

26 are dial plates to which the handles 19 are pivoted, and provided with a scale. These pivoted handles 19 by means of indicating fingers at the end, register the adjustment of the tables 13 on the scale. These dial plates are arranged by the mechanism now to be described, to approach or recede from each other at the same time as, and in unison with, the contraction and expansion of the tables 8 of the fore part gage, but to travel longitudinally in unison with the ball joint carriage E. This mechanism is as follows:—Fixed to the block E¹ on which the ball joint carriage E is mounted, and projecting at each side thereof, is a bar 14, and in each end of this bar are pieces 15 shown by dotted lines (Fig. 5) sliding in and out of the said bar 14. The pieces 15 are made to move in and out by the expansion and contraction of the flat tables 8, as they travel longitudinally away from or toward the disk R. This in and out movement, is brought about by coupling the pieces 15 to the tables 8, by means of pins 16 on the pieces 15, entering slots 17 in the tables 8, so that the expanding of the tables 8 will extend the pieces 15. The slots 17 are made of considerable length, because the forepart gage 7, has a greater travel, than the ball joint carriage E. The dial plates 26 are fixed to these pieces 15. Consequently the dial plates are moved longitudinally by the ball joint carriage, but are expanded and contracted simultaneously with the expansion and contraction of the tables 8 and 13 of the forepart gage.

On the tables 18 are fitted a pair of plates 27 shown in Figs. 1, 2, 3, 3ª and 24 moving at the same rate as, and expanding and contracting with the tables 18. On the plates 27, are engraved shapes or designs of the different bottom shapes 45 of the fore part of the boots and shoes supplied. The plates 27 are held down on the plates 18 by means of slots 28 engaging studs 29 on the tables, and a hole 46 engaging a pin 30 so that they can be readily fixed, or removed and turned over, and refixed to display at the opposite side other designs. Consequently when a person's foot is placed on the fore part gage, it is easy to see which shape is most suitable for the foot.

31 is a cover plate, (Figs. 2, 3ª, 5 and 23,) which is fixed to the circular block E¹ of the ball joint carriage by the screws 32 inserted in the holes 47, and in the center line of this, there is provided a loose center piece 33 (Figs. 2, 3, 3ª, 9, 23 and 25) with the orifice O in it, through which the ends of the measuring tapes N for the ball joint are passed. This center piece being free, enables the orifice O through which the measuring tapes N issue, to adjust itself according to the angle, into which the carriage E has been turned, to suit a left foot or right foot. The tables 18 of the fore part gage are provided with depressions, so that the plate 31 of the ball joint carriage may lie flush with the edges 34 of the tables 18. The object of the cover plate 31 is to provide in conjunction with the plates 27 a rest for the ball joint of the foot and also for ascertaining the shape of the fore part of the foot. The center piece 33 lies in the socket 47 in the block E¹ and projects through the hole 48 in the plate 31.

It is obvious that if desired the ball joint carriage E, the instep carriage U and the fore part gage, can be operated by means of three separate racks 3, H¹ and H shown in Fig. 11 and each rack operated by a separate pinion worked off shaft Q.

In connection with the dial R that is marked with sizes and half sizes, I provide a locking device for locking the dial R in its adjusted position. This locking device (Figs. 1, 2, 4 and 12), comprises a finger or locking arm 35 sliding in a socket 36. The pulling out of this finger 35 by means of the knob 37 operates through a stud 38 engaging in a fork 39 in a lever, a bell hammer 40, Fig. 4, that is, it pulls the hammer away from the bell 41, but when the finger 35 flies by the action of a spring 42 into engagement with any of the slots in the dial R, the hammer is made to strike the bell 41, Figs. 4 and 11, and so produce an audible signal. The locking pin 35 is so arranged that by turning it a little, it is locked by the slot 43 out of engagement with the periphery of the dial R. The fork 39 in the lever, permits of the stud having sufficient play to admit of this.

The mode of using the device is as follows:—The two lengths of each tape are spread apart, on either side of the machine, ready for the reception of a customer's foot, the tapes N being preferably passed between elastic bands 44 on the guards G. The heel of the foot is now placed on the platform B against the uprights B¹ at the back, and the fore part of the foot on the fore part gage. The handle S turning the upright shaft Q is then rotated, and thereby the ball joint carriage E adjusted to locate the ball joint of the foot, the instep carriage U to locate the instep, and the fore part gage brought into correct position ready for use. The guards G enable the ball joint of the foot to be exactly located. The size of the foot can then be plainly read on the disk R, giving the size of boot required. The disk is locked by the finger and the bell rings to indicate it is locked. In the drawing, the disk R registers No. 8 men's size. The turning of the handle also rotates as previously explained the sleeves J and J¹ and the pulley J², and so shortens or pays out relatively the tapes N, N¹ and N². The fitting of the boot is then ascertained firstly by measuring the ball joint of the foot. I do not however measure the ball joint of the foot straight across, but the ball joint carriage E is turned, until the requisite angle is obtained for measuring the ball joint. The two lengths of the tape N are then raised to go around the ball joint of the foot, and the required length of tape having been automatically let out, measurement is taken from a marked point on one length of tape, to a marked point on the other length of tape, thus denoting the fitting of the boot at the ball joint. Secondly, the instep and heel tapes having been automatically paid out by the turning of the disk R to the required extent, the measurement of the instep and heel are taken in a similar manner, thus denoting the fitting required at those parts. Thirdly, the shape of the boot at the fore part most suitable for the comfort of the foot being measured, is shown by the fore part gage, which has engraved upon it the various bottom shapes of boots supplied. This gage which has been automatically moved by the turning of the disk can be further adjusted by the indicating fingers 19 to expand or contract the tables 18 and the plates 27 on the top of them, and make the shape or design thereon correspond with the size of boot registered on the disk.

I declare that what I claim is:—

1. An apparatus for measuring feet and lasts, comprising in combination a base; a support for the heel carried on the base; a gear pivotally mounted on the base; an instep support slidably mounted on the base; a rack attached to said support and meshing with said gear; a second gear pivotally mounted on said base, mechanically connected with said first gear; a ball joint support slidably mounted on the base; a rack mounted on said ball joint support and engaging said second gear; and an indicating device mechanically connected to the said gears.

2. A measuring device for feet and lasts, comprising in combination a base; a heel support mounted on said base; an instep support slidably mounted on said base; a ball joint support slidably mounted on said base; a spline shaft journaled in said base; drums splined on said shaft and swiveled respectively in the instep support and the ball joint support; tapes carried by the respective drums; and mechanical connections between said supports and said shaft to cause the shaft to rotate as the supports are moved.

3. An apparatus for measuring feet and lasts, comprising in combination a base; a heel support mounted on said base; an instep support slidably mounted on said base and having a slot adapted to guide a tape; a ball joint support slidably mounted on said base and having a slot adapted to guide a second tape; a spline shaft mounted in said base; drums splined on said shaft and swiveled in the respective supports; tapes attached to said drums and guided by the slots formed in their respective supports; and mechanical connections between the supports and the spline shaft whereby the latter is caused to rotate as the former are moved for the purpose of winding and unwinding the tapes.

4. A measuring device for feet and lasts comprising in combination a base; a heel support mounted on said base; an instep support slidably mounted on said base; a ball joint support slidably mounted on said base; a spline shaft mounted in said base; drums splined on said shaft and swiveled respectively in the instep support and the ball joint support; tapes carried by the respective drums; mechanical connections between said supports and said shaft to cause the shaft to rotate as the supports are moved; and an indicating device mechanically connected to said supports and adapted to indicate the lengths of shoe corresponding to their successive positions.

5. An apparatus for measuring feet and lasts, comprising in combination a base; a support for the heel mounted on the base; a support for the instep slidably mounted on the base; a support for the ball joint slidably mounted on the base; a shaft pivotally mounted in said base; a graduated dial rigidly mounted on said shaft; a gear rigidly mounted on said shaft; a second and larger gear also rigidly mounted on said shaft; a rack rigidly attached to the instep support and engaging the first or smaller gear; and a rack rigidly attached to the ball joint support and engaging the second or larger gear.

6. An apparatus for measuring feet and lasts comprising in combination a base; a heel support mounted on said base; an instep support slidably mounted on said base and provided with means for guiding a tape; a ball joint support slidably mounted on said base having means for guiding a second tape; a shaft pivotally mounted in the base; an indicating device mechanically attached to said shaft; a gear rigidly attached to said shaft; a second gear rigidly attached to said shaft; a bevel gear rigidly attached to said shaft; a rack rigidly attached to the instep support and meshing with the first gear; a second rack rigidly attached to the ball joint gear; a spline shaft mounted in the base; a second bevel gear mounted on said spline shaft and meshing with the first bevel gear; drums splined on said spline shaft and respectively swiveled in the instep support and the ball joint support; tapes attached to said drums and guided by the guiding means carried by the respective supports.

7. In apparatus for measuring feet and lasts, a girth measuring device comprising in combination a base; a support mounted on said base; guides carried by said support and adapted to direct a tape; a shaft journaled in the base; a drum mounted on said shaft; a tape attached to said drum, and guided by the guides in the support; and mechanical means whereby the shaft is caused to rotate to a position corresponding to the lengths of the foot measured.

8. A device for measuring feet and lasts, comprising in combination a base; a heel support mounted on the base; a movable support slidably mounted on the base; supporting plates pivotally mounted on said movable support and adapted to carry shoe contours; guides rigidly attached to the base; projections carried on said supporting plates and engaging said guides; means for moving said movable support; and mechanical connection between said means and an indicating device.

9. In devices for measuring feet, a platform for supporting the forward portion of the foot, comprising in combination a base; a support slidably mounted on said base; a second support slidably mounted on said base; means for moving said supports simultaneously and at different speeds; plates pivoted to said second support; guides mounted on the base; lugs carried by said pivoted plates and engaging said guides; a second set of plates pivoted to the first set of plates and adapted to carry diagrams of shoe contours; a cross arm carried by the first sliding support; members slidably mounted in said cross arm; lugs on said sliding members engaging slots in the first set of pivoted plates; dial plates carried by said sliding members; levers pivoted to said dial plates; and links pivoted to said levers having lugs engaging slots in the second set of pivoted plates.

10. In devices for measuring feet, a platform for supporting the forward portion of the foot, comprising in combination a base; a support slidably mounted on said base; a second support slidably mounted on said base; means for moving said supports simultaneously and at different speeds; plates pivoted to said second support; guides mounted on the base; lugs carried by said pivoted plates and engaging said guides; a second set of plates pivoted to the first set of plates and adapted to carry diagrams of shoe contours; a cross arm carried by the first sliding support; members slidably mounted in said cross arm; lugs on said sliding members engaging slots in the first set of pivoted plates; dial plates carried by said sliding members; levers pivoted to said dial plates; links pivoted to said levers having lugs engaging slots in the second set of pivoted plates; tape guides carried by the first sliding support and swiveled thereon; and a tape guided thereby.

11. In devices for measuring feet, a platform for supporting the forward portion of the foot, comprising in combination a base; a support slidably mounted on said base; a second support slidably mounted on said base; means for moving said supports simultaneously and at different speeds; plates pivoted to said second support; guides mounted on the base; lugs carried by said pivoted plates and engaging said guides; a second set of plates pivoted to the first set of plates and adapted to carry diagrams of shoe contours; a cross arm carried by the first sliding support; members slidably mounted in said cross arm; lugs on said sliding members engaging slots in the first set of pivoted plates; dial plates carried by said sliding members; levers pivoted to said dial plates; links pivoted to said levers and having lugs engaging slots in the second set of pivoted plates; tape guides carried by the first sliding support; and a tape guided thereby.

12. An apparatus for measuring feet and lasts, comprising in combination a base; a heel support carried on said base; guides adapted to direct a tape to said heel support; an instep support slidably mounted on said base; guides carried by said instep support adapted to direct a tape; a ball joint support slidably mounted on said base; a guiding member swiveled therein and adapted to direct a tape; a fore-part support slidably mounted on said base; plates pivotally mounted on said fore-part support; guides on the base; lugs on said pivoted plates engaging said guides; a second set of plates pivotally mounted on said first set of plates and adapted to carry diagrams of shoe contours; a cross arm carried by the instep support; members slidably mounted in said cross arm; lugs on said sliding members engaging slots in the first set of pivoted plates; dial plates carried by said sliding members; levers pivoted to said dial plates; links pivoted to said levers and having lugs engaging slots in the second set of pivoted plates; a shaft journaled in the base; an indicating device mechanically connected to said shaft; a gear rigidly mounted on said shaft; a second gear rigidly mounted on said shaft; a bevel gear rigidly mounted on said shaft; a spline shaft journaled in the base; a drum rigidly attached to said spline shaft; a tape attached to said drum and guided to the heel support; drums splined on said shaft and swiveled respectively in the instep support and the ball joint support; tapes attached to said drums and guided by the guides in the respective supports; a second bevel gear rigidly attached to said spline shaft and meshing with the first bevel gear; a rack rigidly attached to the instep support and engaging the first gear; a second rack rigidly attached to the ball joint support and engaging the second gear; a third rack rigidly attached to the fore-part support; and a gear train mechanically connecting said third rack to one of the other racks.

13. In a device of the class described, the combination of a support for the heel; a second support for another part of the foot, said supports being movable relatively to each other; a measuring tape; and mechanism connected to said tape and operated by the relative movement of said supports to draw in or pay out said tape.

14. In a device of the class described, the combination of a support for the heel; a second support for another part of the foot, said supports being movable relatively to each other; tapes carried by the supports; and mechanism connected to said tapes and operated by the relative movement of said supports to draw in or pay out said tapes.

15. In a device of the character described, the combination of a plurality of relatively movable supports for different portions of a foot, girth measuring tapes carried by said supports; and a mechanism connected to said tapes and operated by the relative movement of said supports to pay out or draw in said tapes.

16. In a device of the character described, the combination of a base frame; a heel support mounted on said frame; a ball joint carriage mounted to move longitudinally on said frame; plates pivoted on said ball joint carriage; and connections between said plates and the base whereby said plates are caused to move laterally as the ball joint carriage is moved.

In witness whereof, I have hereunto signed my name this 15 day of May 1908, in the presence of two subscribing witnesses.

WILLIAM CHURCH.

Witnesses:
WILLIAM BARKER,
ARTHUR GEORGE STEVENSON.